United States Patent [19]

Michael et al.

[11] Patent Number: 5,108,789

[45] Date of Patent: Apr. 28, 1992

[54] METHOD FOR MANUFACTURING DISK-SHAPED RECORDING MEDIA

[75] Inventors: Klaus Michael, Gelnhausen-Haitz; Andreas Petz, Bruchkoebel, both of Fed. Rep. of Germany

[73] Assignee: Leybold Aktiengesellschaft, Hanau, Fed. Rep. of Germany

[21] Appl. No.: 489,162

[22] Filed: Mar. 6, 1990

Related U.S. Application Data

[62] Division of Ser. No. 295,232, Jan. 9, 1989, Pat. No. 4,936,180.

[30] Foreign Application Priority Data

Nov. 5, 1988 [DE] Fed. Rep. of Germany ....... 3837688

[51] Int. Cl.$^5$ .......................... B23B 1/00; B05D 5/06; B29D 11/00
[52] U.S. Cl. ..................................... 427/164; 82/1.11; 264/1.3; 264/1.9; 264/2.7; 425/DIG. 201; 427/290; 427/296; 427/412.1
[58] Field of Search ................. 264/1.3, 2.7, 129, 106, 264/1.9; 82/1.11, 1.12; 427/163, 164, 290, 296, 412.1; 425/DIG. 20

[56] References Cited

U.S. PATENT DOCUMENTS

| | | | |
|---|---|---|---|
| 4,330,910 | 5/1982 | Schachl et al. | 29/90.1 |
| 4,671,145 | 6/1987 | Fehrenbach et al. | 82/1.11 |
| 4,793,953 | 12/1988 | Maus | 264/2.5 |
| 4,928,561 | 5/1990 | Fouche | 82/1.11 |

FOREIGN PATENT DOCUMENTS 136301 6/1987 Japan ..................... 82/1.11

Primary Examiner—James Lowe
Attorney, Agent, or Firm—Felfe & Lynch

[57] ABSTRACT

Method for machining flat, circular disk-shaped recording media, for example, audio, video or ROM compact disks, for the purpose of improving their surface quality and their dimensional stability, employs a lathe having a driven lathe spindle (7), a vacuum chuck (8) for holding the recording medium or substrate (15, 15'...) to be machined, and a carriage (9) for holding and guiding the cutting tool (5) magazine (14) hold the machined and unmachined substrates, there being further provided a robot (10) held on the base (2) or bed (4) of the lathe and having a gripper arm (11) with gripping tongs (12) movable in several planes which transport the substrates from one magazine (14) to the vacuum chuck (8) or from the vacuum chuck to the other magazine, the stacking axes (L) of the two magazines extending at an angle to the horizontal plane (E), and the magazines being maintained within the range of action of the gripper arm (11) with gripping tongs (12).

9 Claims, 2 Drawing Sheets

METHOD FOR MANUFACTURING DISK-SHAPED RECORDING MEDIA

This is a division application of application Ser. No. 295,232, filed Jan. 9, 1989, now U.S. Pat. No. 4,936,180.

BACKGROUND OF THE INVENTION

The invention relates to a method for machining workpieces, particularly flat circular disk-shaped substrates, for the purpose of improving their surface quality and their dimensional stability, using a lathe, a driven lathe spindle, a chuck for holding the substrate to be machined, and a carriage for holding and guiding the tool, and magazines for holding the machined and unmachined substrates. The invention also relates to disk-shaped recording media produced by the method.

It is known to mold circular disk-shaped recording media for example, audio, video or ROM compact disks, from a plastic and then to coat these moldings or substrates in a vacuum unit with a light-reflecting coating and to provide the latter in turn with a protective lacquer coating. Such disks have the drawback that their surface quality and shape retention only meet average requirements.

SUMMARY OF THE INVENTION

The invention has as its object to machine fully automatically the surfaces of molded circular, disk-shaped substrates, so that their surface quality, accuracy of form and dimensional stability satisfy the most stringent requirements. Moreover, the method employs magazines in which the substrates are stacked.

Furthermore, method assures that the disk-shaped, thin substrates will not warp or otherwise become deformed while being machined. Finally, the method accomplishes transportation of the substrates with a robot that is of simple construction, whose task-performing steps are fixed-programmed, and which operates without measuring, locating or tactile sensing means.

In accordance with the invention, this object is accomplished through a robot held on the base or bed of the lathe and having a gripper arm with gripper tongs movable in several planes, at least two stacking magazines being provided whose stacking axes extend at an angle to a horizontal plane and which are maintained within the range of action of the gripper arm with gripping tongs.

A special feature of the invention is an oblique positioning of the sender and receiver magazines, the so-called carriers. When the magazines are positioned horizontally, the disks (or substrates) to be handled are not in a well-defined position, which militates against sure-handed manipulation by the robot. The inventive handling concept in conjunction with the gripping tongs which grasps the substrates at their outer circumference (off-center center substrate pickup) and with the positioning precision made possible (without the use of a complicated exploring system that is prone to malfunction) by the work-holding cone of the vacuum chuck provides for extremely reliable operation.

DETAILED DESCRIPTION OF THE PREFERRED EMBODIMENT

Figure 1:
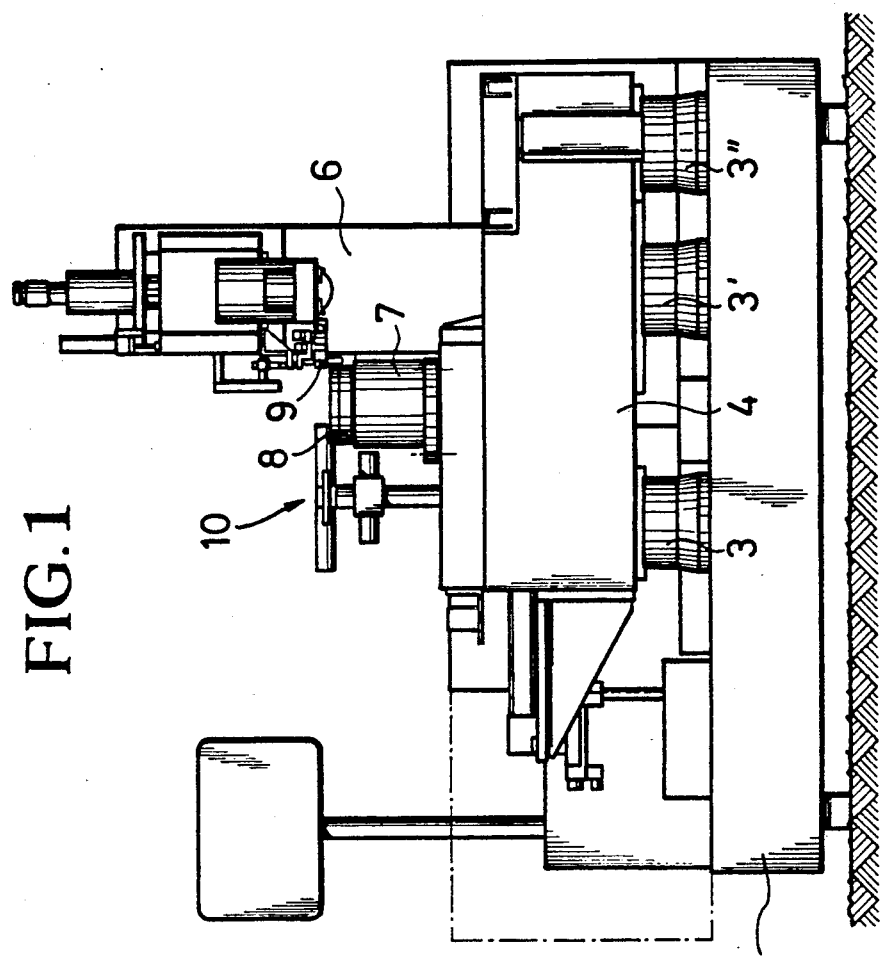
FIG. 1 is a side elevation of a diamond-tool lathe.
Figure 2:
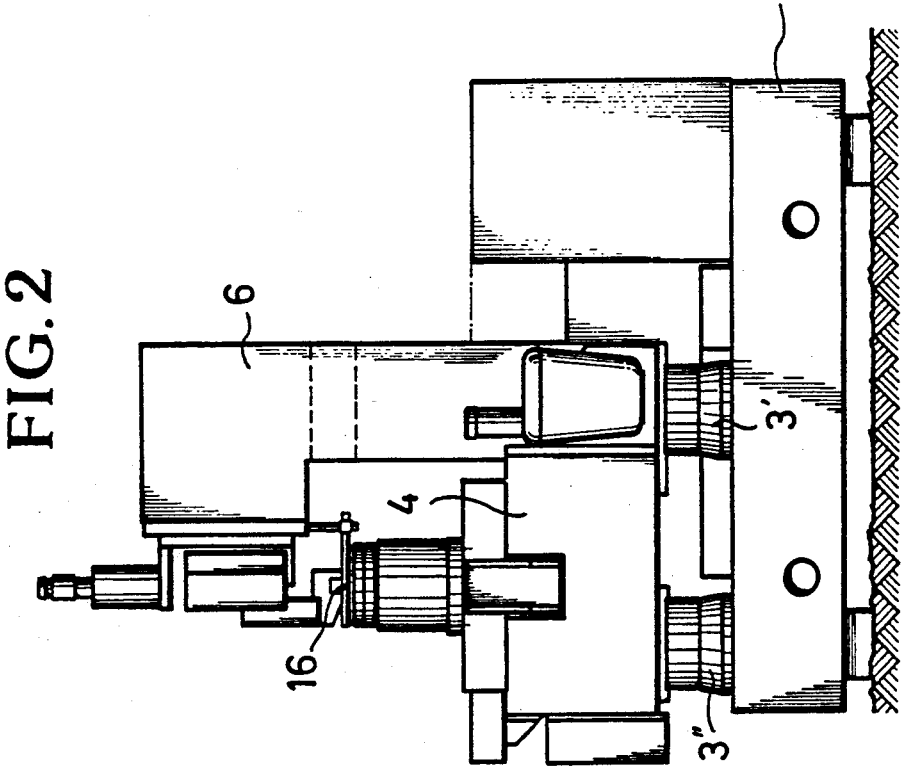
FIG. 2 is a further side elevation of the lathe of FIG. 1.
Figure 3:
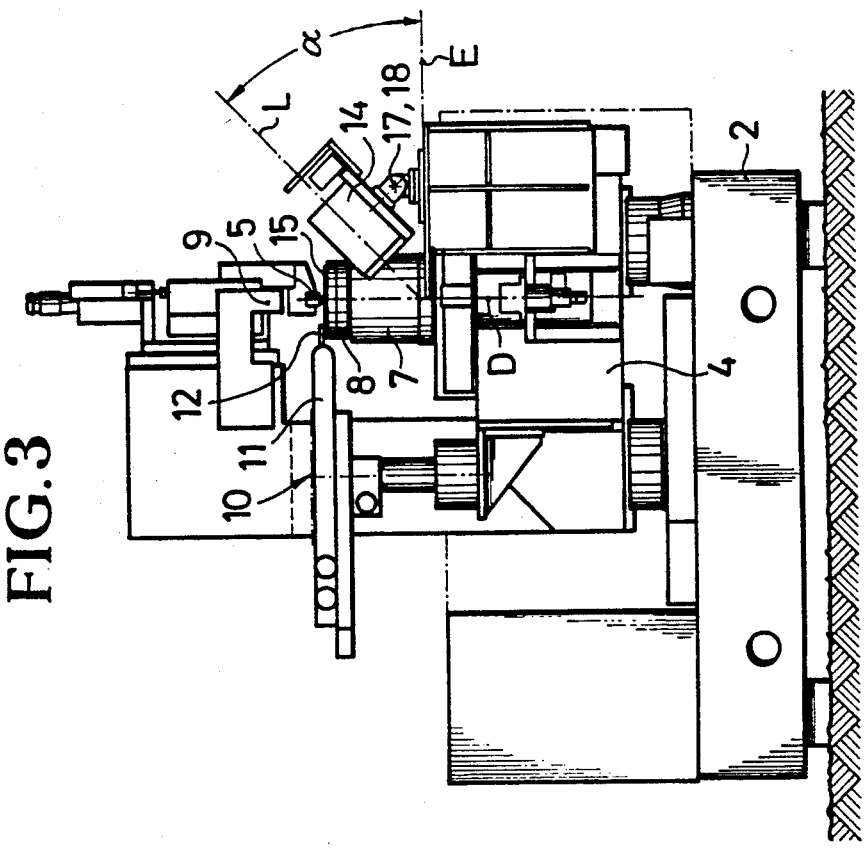
FIG. 3 is a third side elevation of the lathe of FIGS. 1 and 2.
Figure 4:
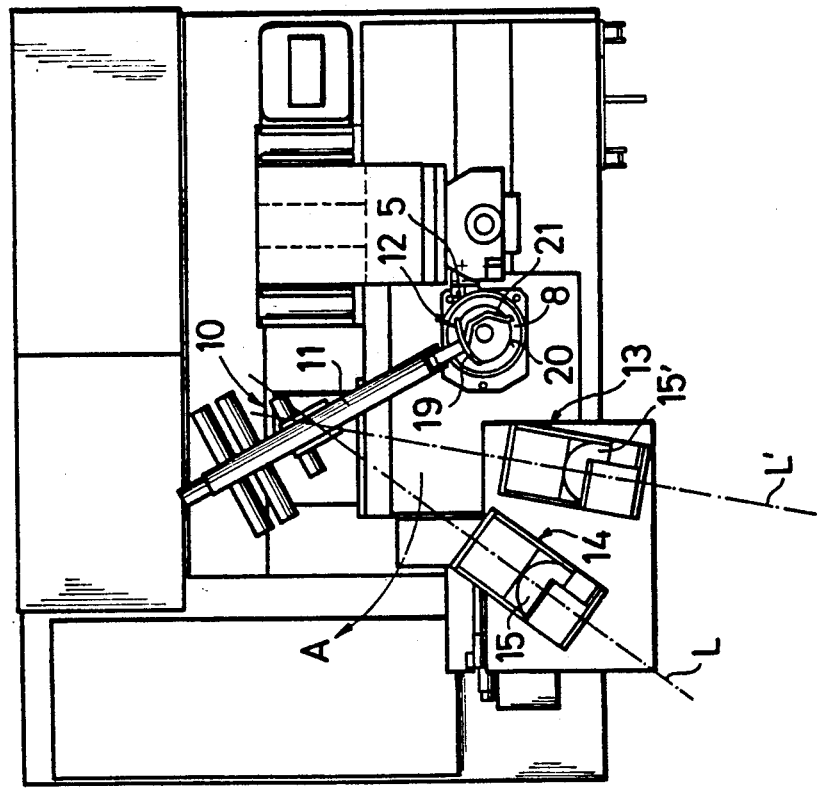

FIG. 4 is a plan view of the lathe of FIGS. 1 to 3.

The lathe, shown considerably simplified in the drawings, essentially consists of a base 2 which supports, by means of three shock or vibration absorbers 3, 3', 3", the lathe bed 4 with the column 6 carrying the diamond cutting tool with the carriage 9 and the lathe spindle 7 with the vacuum chuck 8, there being further mounted on the lathe bed 4 a robot 10 with six axes and comprising a gripper arm 11 and gripping tongs 12, as well as two magazines 13, 14.

A first magazine 14 and a second magazine 13 are held on the lathe bed 4 in such a way that their stacking or normal axes L, L' extend at an angle $\alpha$ of about 45 degrees to the horizontal plane E (FIG. 3). This angle is adjustable by pivoting the magazines about respective axes 17, 18. The magazines 13, 14 are filled with disk-shaped substrates 15, 15', which because of the inclined disposition of the magazines occupy a well-defined position therein since they all abut on the wall portions of one of the sides of a given magazine 13, 14. Note that the angle $(90° - \alpha)$ from the vertical must be sufficient for gravity to align the substrate against the wall portions, whereby the normal axes of the substrates are coliner.

The gripper arm 11 of the robot 10 at first pivots from the position shown in FIG. 4 in a direction of rotation indicated by the arrow A until its longitudinal axis is precisely aligned with the center or the stacking axis L of the magazine 14. The gripping tongs 12 then move out of the gripper arm 11 in its longitudinal direction until the gripping tongs 12 are in proximity to the uppermost circular disk-shaped substrate 15 in the magazine 14 and are able to grasp it.

The gripper means then picks up the substrate 15 from first magazine 14, pivots counter to the direction of the arrow A until the longitudinal axis of the gripper arm 11 intersects the axis of rotation D of the lathe spindle 7, and deposits the substrate 15 on the vacuum chuck 8, where the substrate 15 is held by the suction pressure acting on its underside. A measuring tactile sensor 16 mounted on the column 6 then moves up to the substrate 15 and determines the thickness of that circular disk-shaped substrate. The lathe spindle 7 is then set into rotation by means of a motor, not shown in detail, with the carriage 9 guiding the diamond cutting tool 5 radially across the substrate 15, a chip of a given thickness being so removed. (The depth of cut is equal to one-half the measured or sensed deviation from the desired thickness of the substrate.) After one side of the substrate 15 has been lathed, the substrate is grasped by the gripper arm 11 moving forward from a rear position, picked up from the carriage 9, turned 180 degrees, and laid by its already machined side on the vacuum chuck 8. The diamond cutting tool 5 then again moves across the substrate 15, turning the second side. Finally the gripping tongs 12 pick up the substrate 15 from the chuck 8 and deposit it in second magazine 13, with the gripper arm 11 lining up with the axis L'.

The robot 10 is of relatively simple construction since it is able to operate with fixed-programmed settings because of the inclined position of the magazines 13 and 14, the high precision of the substrates 15, 15' and so forth (particularly with respect to their outside diameter), and the precise position of the vacuum chuck 8. Under these conditions all disk-shaped substrates 15, 15' first have to be precision-machined with respect to their outside diameter so that the gripping tongs 12 can find, grasp and hold the substrate every time without fail.

To this end, the gripping tongs 12 consist of a roughly arcuate bow 19 provided at its free ends with notches or bosses which cooperate with the circumferential edge 20 of the substrate 15, 15', and of a displaceable finger 21 which grasps the opposite circumferential portion of edge 20 of the substrate.

It should be noted that the substrates 15, 15' machined on the apparatus described are distinguished by far better dimensional stability, especially with regard to thickness, and far better surface quality and shape retention than conventional substrates produced merely by molding, and that they are therefore suitable for use particularly as optical recording media, for example, as high-quality audio, video or ROM compact disks.

Moreover, it should be noted that only a diamond-tool lathe which meets the most stringent requirements with regard to precision preferably can be used, one that is equipped with an air-bearing spindle 7 and with a massive bed 4 of granite.

Finally, a considerable advantage of the apparatus described is that it operates fully automatically and picks up the substrates 15, 15' one after the other from a first magazine 14 and after machining them deposits them in a similar magazine 13, so that the magazines can be replaced without any downtime of the lathe.

We claim:

1. Method for manufacturing a disk-shaped optical recording medium, said method comprising the steps of:
   providing a disk-shaped substrate of molded plastic, said substrate having opposed planar surfaces and a circumference,
   turning at least one planar surface of said substrate in a diamond tool lathe,
   coating said substrate with a light-reflecting coating.

2. Method as in claim 1 wherein both of said planar surfaces are turned in a lathe.

3. Method as in claim 1 wherein said light-reflecting coating is applied in a vacuum unit.

4. Method as in claim 1 wherein said light-reflecting coating is then coated with a protective lacquer coating.

5. Method as in claim 1 wherein after providing said disk-shaped substrates, said substrates are stacked in a first magazine with their normal axes at an angle from the vertical which is sufficient for gravity to align the substrates so that their normal axes are colinear, whereby the substrates are positively positioned to facilitate robotic handling.

6. Method as in claim 5 further comprising the steps of
   picking up each substrate from said first magazine by a pair of gripping tongs on a gripping arm of a robot,
   rotating said gripping arm until the longitudinal axis thereof intersects the vertical axis of a lathe spindle,
   placing said substrate on a vacuum chuck fixed to said lathe spindle, and
   rotating said lathe spindle while a cutting tool is moved radially across a planar surface of said substrate to turn said surface.

7. Method as in claim 6 wherein the thickness of the substrate is measured by a tactile sensor while said substrate is on said vacuum chuck.

8. Method as in claim 6 wherein after turning one planar surface of said substrate, it is rotated through 180° and laid with its turned surface on the vacuum chuck in order to be turned the opposed planar surface.

9. Method as in claim 1 wherein providing said disk-shaped substrate of molded plastic comprises molding said disk-shaped substrate from said plastic.

* * * * *